United States Patent
Vossberg et al.

(10) Patent No.: US 10,357,853 B2
(45) Date of Patent: Jul. 23, 2019

(54) SAFETY DEVICE FOR MOUNTING IN THE GAS SUPPLY INSTALLATION OF A CUTTING TORCH OF A FLAME-CUTTING MACHINE

(71) Applicant: Messer Cutting Systems GmbH, Gross-Umstadt (DE)

(72) Inventors: Reinald Vossberg, Hofheim (DE); Burkhard Fenner, Otzberg (DE)

(73) Assignee: Messer Cutting Systems GmbH, Gross-Umstadt (DE)

( * ) Notice: Subject to any disclaimer, the term of this patent is extended or adjusted under 35 U.S.C. 154(b) by 33 days.

(21) Appl. No.: 15/531,937

(22) PCT Filed: Nov. 30, 2015

(86) PCT No.: PCT/EP2015/078032
§ 371 (c)(1),
(2) Date: Jan. 16, 2018

(87) PCT Pub. No.: WO2016/087356
PCT Pub. Date: Jun. 9, 2016

(65) Prior Publication Data
US 2018/0185969 A1    Jul. 5, 2018

(30) Foreign Application Priority Data
Dec. 3, 2014 (DE) .................. 10 2014 117 756

(51) Int. Cl.
*B23K 37/00* (2006.01)
*B23K 7/00* (2006.01)
(Continued)

(52) U.S. Cl.
CPC .............. *B23K 37/006* (2013.01); *A62C 4/02* (2013.01); *B23K 7/00* (2013.01); *B23K 7/10* (2013.01);
(Continued)

(58) Field of Classification Search
CPC .......... A62C 4/02; B23K 37/006; B23K 7/00; B23K 7/10; F23D 14/32; F23D 14/42; F23D 14/74; F23D 14/825
(Continued)

(56) References Cited

U.S. PATENT DOCUMENTS

| 2009/0050609 A1 | 2/2009 | Berger et al. |
| 2009/0253089 A1 | 10/2009 | Talkington et al. |

(Continued)

FOREIGN PATENT DOCUMENTS

| AT | 504 255 A1 | 4/2008 |
| DE | 32 40 247 A1 | 5/1983 |

(Continued)

OTHER PUBLICATIONS

Espacenet English Language Abstract for DE 32 40 247, published May 26, 1983.
(Continued)

*Primary Examiner* — Scott R Kastler
*Assistant Examiner* — Michael Aboagye

(57) ABSTRACT

The relevant regulations in the field of automated flame-cutting technology stipulate various safety devices for the process-gas supply of a cutting torch. The invention relates to the simplified installation and maintenance of the safety devices and to a compact structure thereof. Proposed is a multi-functional safety module, in the module body of which there are integrated a first and a second safety element to prevent flame- or gas-blowout, and in which there is provided a mechanical plug-type connection for establishing a gas-tight connection between the safety elements and the corresponding gas lines of the cutting torch.

11 Claims, 1 Drawing Sheet

Figure 1:
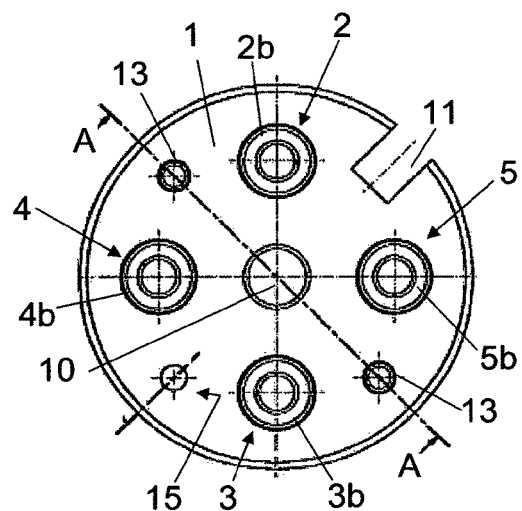

(51) Int. Cl.
*A62C 4/02* (2006.01)
*F23D 14/32* (2006.01)
*F23D 14/42* (2006.01)
*F23D 14/74* (2006.01)
*F23D 14/82* (2006.01)
*B23K 7/10* (2006.01)

(52) U.S. Cl.
CPC ............. *F23D 14/32* (2013.01); *F23D 14/42* (2013.01); *F23D 14/74* (2013.01); *F23D 14/825* (2013.01)

(58) Field of Classification Search
USPC ....... 266/48, 49, 74; 219/70, 74, 75, 137.31, 219/138, 139, 136, 144; 137/614.2; 430/158, 363; 431/158, 363
See application file for complete search history.

(56) References Cited

U.S. PATENT DOCUMENTS

| | | | |
|---|---|---|---|
| 2014/0030666 A1* | 1/2014 | Pryor | B23K 5/22 431/346 |
| 2014/0217070 A1 | 8/2014 | Pikus et al. | |
| 2015/0048065 A1 | 2/2015 | Berger et al. | |

FOREIGN PATENT DOCUMENTS

| | | |
|---|---|---|
| DE | 3524773 A1 | 1/1987 |
| GB | 919209 | 3/1959 |

OTHER PUBLICATIONS

Espacenet English Language Abstract for DE 35 24 773, published Jan. 22, 1987.

* cited by examiner

SAFETY DEVICE FOR MOUNTING IN THE GAS SUPPLY INSTALLATION OF A CUTTING TORCH OF A FLAME-CUTTING MACHINE

TECHNICAL FIELD

The present invention refers to a safety device for mounting in the gas supply installation of a cutting torch of a flame-cutting machine.

Furthermore, the present invention refers to a flame-cutting machine, comprising a cutting torch and a gas supply installation for the cutting torch.

The safety device according to the invention is designed for use in the thermal material processing of workpieces.

The thermal processing of workpieces with a cutting torch comprises the cutting of workpieces and the surface treatment for producing markings. Depending on the task to be handled, different processing machines and different types of processing tools are used. Different processing tools, such as oxy-fuel torches, plasma torchers or lasers, are available for the thermal cutting of workpieces.

Automated cutting takes place by way of flame-cutting machines that are normally equipped with a multitude of cutting torches. These are fed with cutting oxygen and fuel gas via hose lines or pipes. Supply lines for heating oxygen and for an ignition gas are often provided in addition. Instead of pure oxygen, compressed air is also used as combustion gas. For the sake of simplicity the term "oxygen" will collectively encompass all oxygen-containing combustion gases in the following.

Cutting torches form tapping points of a gas supply installation. The gas to be tapped is under pressure and thus already represents a certain potential risk for users and environment. Additional risks are posed by gas installations for combustible or toxic gases, such as methane, propane, natural gas, hydrogen, liquid gas, carbon monoxide, halogens and particularly acetylene.

Therefore, gas installations and operations on operative gas lines are subject to special accident prevention and protection rules. These can be gathered from the trade association regulations. For instance, the DGUV Rule 100-500 (formerly: BGR 500) "operating of work equipment" stipulates in Chapter 3.15 with the title "safety devices" that hazards caused by flame blowout, reverse flow of gas or further flow of gas should be prevented by providing extraction points on distribution lines with safety devices conforming to the gas type and pressure (safety fittings for tapping points). This is for instance accomplished in that safety devices are used with an integrated flame arrester or barrier according to DIN EN 7310-1.

Hence, corresponding safety devices are inserted for each gas into the cutting torches or into the supply lines for oxygen and fuel gas. Since the respective gas pressures and gas quantities are different, every gas shut-off valve needed and possibly also check valves require filters, manometers for the inlet pressure, pressure reducers or possible manometers for the operating pressure, solenoid valves for switching on and off and in some cases also adjusting valves in the form of needle valves for the exact adjustment of the pre-reduced pressures and amounts.

PRIOR ART

A safety device for the gas supply of a flame-cutting machine of the above-mentioned type is known from DE 35 24 773 A1. The respective gas supply lines are connected, on the one hand, via torch connections to the cutting torch and via movable hoses to supply sources for fuel gas, cutting oxygen and heating oxygen. The lines have inserted therein safety devices for controlling gas amounts and shut-off units in the form of solenoid valves by means of which the corresponding gas line is closable. The control magnets are connected via control lines to an NC flame-cutting machine control.

The cutting torches themselves consist essentially of a so-called "valve body" which on its top side comprises the said torch connections for the process gas supply and which is connected via a guide pipe to the real torch head. The valve body has arranged therein an injector that is connected at the inflow side to the fuel-gas and heating-oxygen line and at the outflow side to the heating gas supply pipe. Heating gas means a mixture of fuel gas and heating oxygen. The heating gas supply pipe is connected at the outflow side to the torch head. A heating gas bore which is connected to the heating gas supply pipe and which terminates in an annular space communicating with the annular heating channel of the flame cutting nozzle is provided in the torch head. Via the torch connection for cutting oxygen and bores arranged in the valve body, a cutting oxygen pipe is connected to a cutting oxygen bore arranged in the torch head. The cutting oxygen bore communicates with the cutting oxygen channel of the flame-cutting nozzle.

TECHNICAL OBJECT

Pipe parts are connected via solder connections, optionally using solder sleeves and connection points, which after soldering allow a gastight screw connection with correspondingly equipped pipe parts or supply and control elements. Hence, for the buildup of a supply and/or control route, solder and screw connections are needed for each individual gas on the valve body of the cutting torch and also at each inlet and outlet of the flame-cutting machine control stand and for each safety and control device. The measurement, control and safety devices for the supply media are combined in the joint flame-cutting machine control.

The many solder and screw points require a lot of space and entail high manufacturing efforts. The installation is prone to errors also in the case of a careful examination, and defects may also occur at a later time. Possible leakages may lead not only to malfunctions, but also increase fire and explosion hazards. This requires regular functional checks and maintenance, which because of the great number and complexity of the connections, which in part are moreover difficult to access, is difficult and complicated.

It is therefore the object of the present invention to provide a simplified installation for the process gas supply of a cutting torch of a flame-cutting machine, in which the above-mentioned drawbacks are reduced and which is particularly distinguished by a compact structure and comparatively small manufacturing and maintenance efforts.

Furthermore, it is the object of the present invention to indicate a flame-cutting machine in which the above-mentioned drawbacks are reduced and which is distinguished by small manufacturing and maintenance efforts.

GENERAL DESCRIPTION OF THE INVENTION

This object is achieved starting from a safety device of the above-mentioned type, the safety device comprising according to the invention:

a multifunctional safety module which is connectable to the cutting torch and which has a module body (1), the module body (1) having integrated therein:
  a first safety element (4) to prevent flame- or gas-blowout, which between a fuel gas inlet (4a) and a fuel gas outlet (4b) comprises a gas channel (4c) for fuel gas that is connectable to a fuel gas line of the cutting torch, and
  a second safety element (3) to prevent a flame- or gas-blowout, which between a cutting oxygen inlet (3a) and a cutting oxygen outlet (3b) comprises a gas channel (3c) for cutting oxygen that is connectable to a cutting oxygen line of the cutting torch,
and a connection system to establish a mechanical plug-type connection between fuel gas outlet (4b) and fuel gas line and between cutting oxygen outlet (3b) and cutting oxygen line.

The safety device comprises a safety module and at least one connection system.

The connection system is configured to establish a mechanical plug-type connection that connects the fuel gas outlet to the fuel gas line and the cutting oxygen outlet to the cutting oxygen line, respectively. Moreover, connections for further process gases, for instance for ignition gas or heating oxygen, may also be integrated into the connection system. The connection system comprises one or plural connection elements and is part of the safety device. Preferably, the connection system is integrated into the module body. It has turned out to be useful when at least one of the connection elements of the connection system is configured such that it is connectable to a separate, corresponding connection counter-element while forming the mechanical plug-type connection. Connection elements and connection counter-elements in this sense are for instance connection sleeves, connection plugs, couplings or nipples. The connection element and/or the connection counter-element may consist of several separate components or are combined to form a single connection component. A single connection component with one or plural connection elements has the advantage that this allows a particularly simple and quickly producible connection of the respective outlets with the corresponding line.

Moreover, the safety module comprises a module body which in the simplest case is configured as a monolithic block and which is provided with at least two, preferably three to five bores, each being designed for receiving at least one safety element for a specific process gas.

Since the safety device comprises both the connection system and the safety elements, this yields a particularly compact safety device.

The module body of the safety device according to the invention has integrated therein at least two safety elements that are configured such that a flame- or gas-blowout from the gas line of the cutting torch to the gas inlet is prevented.

Safety elements in the sense of the invention are for instance flame arresters or gas flashback arresters.

Flame arresters are devices which have the function to allow fluid flow through the safety device, but simultaneously prevent flame blowout through the safety device. To prevent flame blowout, flame arresters normally comprise a flame barrier.

Gas flashback arresters are devices which have the function to prevent a gradual or sudden reverse flow of gas.

Each of these safety elements represents a tapping-point safety means (safety device), as are also standard in gas supply devices, for instance a gas flashback arrester or a flame barrier.

The safety module is connected to the torch without the module itself being part of the torch, e.g. onto the torch shaft and particularly onto the so-called "valve body" of the torch. In the connection the gas lines for the process gases (fuel gas and cutting oxygen and possible other process gases), which extend inside the torch up to the torch nozzle, are fluidically connected to the corresponding gas outlets of the safety module. This mechanical connection must of course be gastight. Torch and safety module thereby form a subassembly matched to each other mechanically and fluidically.

The gastight connection between the gas outlets of the safety module and the gas connections at the torch side is established according to the invention by way of mechanical plug-type connections. In the simplest case the gas outlets of the safety elements are configured as nozzles that correspond to the bores or tubes at the torch side. These plug-type connections can simultaneously contribute to the form-fit connection of module unit and torch (but other connecting means are normally provided for this purpose). The sealing function can be achieved by way of at least one sealing element that is arranged at the front side between the gas outlet side of the safety module and the torch, and/or by way of plural sealing elements that radially seal the respective gas outlets relative to the torch-side gas lines.

According to the number of the integrated safety elements the safety module thus replaces a corresponding number of the safety devices that are otherwise somewhere inserted in the gas supply line system. The number of the gas-tight connections to be otherwise established for the safety elements is thereby approximately halved; moreover, the safety elements in the safety module are visibly assigned to the respective process gas and can thus be found and assigned easily for maintenance. The establishment of the plug-type connection between safety module and torch for the gastight connection of all gas connections integrated in the safety module can take place at the same time and requires a few operations only. Moreover, the space required is comparatively small, which allows a lower overall height than for instance with a screw connection.

The joining of a specific safety element for each process gas in a single fitting, the safety module, in combination with the configuration of the gas connections as plug-type connections thereby saves time in mounting and maintenance, reduces the error rate and allows a compact design of the safety device according to the invention.

Apart from the safety elements for fuel gas and cutting oxygen, safety elements (safety devices) for other process gases may be provided in the same safety module.

In this respect, in a preferred embodiment of the safety device according to the invention, the module body has integrated therein a third safety element for preventing flame- or gas-blowout, said third safety element comprising between a heating oxygen inlet and a heating oxygen outlet a gas channel for heating oxygen that is connectable to a heating oxygen line of the cutting torch, wherein the mechanical plug-type connection simultaneously serves to connect heating oxygen outlet and heating oxygen line.

In a particularly preferred embodiment of the safety device, the module body has integrated therein a fourth safety element for preventing a flame- or gas-blowout, said fourth safety element comprising between an ignition gas inlet and an ignition gas outlet a gas channel which is connectable to an ignition gas line of the cutting torch, the mechanical plug-type connection simultaneously serving to connect ignition gas outlet and ignition gas line.

Within the module body the arrangement of the bores for receiving the safety elements for the specific process gases is adaptable to the respective geometrical requirements, as are given by the torch. As a rule, however, it has turned out to be advantageous when the module body is cylinder-shaped and has a central axis, wherein one of the safety elements extends coaxial to the central axis.

The centrally extending safety element is for instance particularly suited for the supply of oxygen.

Depending on the occupation of the radial positions around the central axis, the central position of the safety module may be difficult to access without any special precautions. A particularly compact design of the safety device will therefore be achieved if the module body is made cylindrical and has a central axis around which first, second, third and fourth safety elements are evenly distributed. Preferably, the first, second, third and fourth safety elements are arranged, viewed in a cross-sectional plane perpendicular to the central axis, on a circular path around the central axis. In this case its distribution is uniform if all of the neighboring safety elements that are arranged on the circular path have the same minimum distance relative to one another. The module body preferably comprises a gas inlet side and a gas outlet side facing the cutting torch. The central position is here preferably left open for the gas passage, so that the module body comprises a through bore running between inlet side and outlet side, which preferably extends coaxial to the central axis.

The through bore can for instance serve to receive and guide electrical operation, measurement or control lines through the safety module.

A reliable and tight connection between safety module and torch can e.g. be established via a flange. However, with respect to an overall height that is as small as possible, it has turned out to be advantageous when the connection system comprises a threaded connection with at least two screws that extend from the module-body inlet side into threaded bores of the cutting torch.

In the simplest case at least the first safety element and the second safety element are configured as gas flashback arrester. This is equally applicable to possible further safety elements implemented in the safety module.

In a preferred embodiment of the safety device, the fuel gas outlet and the cutting oxygen outlet are each configured as an outlet nozzle with an inner bore, a gas flow baffle being respectively insertable into the inner bore.

With the help of the gas baffle the gas flow rate is limited. The fine adjustment of the gas flow rate is carried out via the gas pressure. In this embodiment an adjusting valve for adjusting the gas flow rate is omitted, which results in a particularly small overall height and a simplified mounting and maintenance.

The connection between safety module and torch is configured as a plug-type connection. It has turned out to be useful when the connection system further comprises a plug-type connection between the fuel gas inlet and a fuel gas supply line and a plug-type connection between the cutting oxygen inlet and a cutting-oxygen supply line.

The gas connections are here configured at both sides of the safety module as plug-type connections. These can be established more quickly in comparison with threaded connections and they require less space. This configuration is also preferred for the connections of possible further safety elements.

As for the flame cutting machine, the above-mentioned object is achieved according to the invention in that it comprises a safety device according to the invention which is mounted in the gas supply installation and in which the safety module is connected to the cutting torch, the first safety element to a fuel gas line of the cutting torch and the second safety element to a cutting oxygen line of the cutting torch.

A flame-cutting machine in which the specific safety elements for each process gas are combined in a single fitting, the safety module, can be maintained easily and at low costs. Moreover, the retrofitting of the machine, for instance upon change of the cutting torch, is facilitated by the provision of the safety module. At the same time the safety module allows a compact design of the flame-cutting machine according to the invention.

EMBODIMENT

Figure 2:
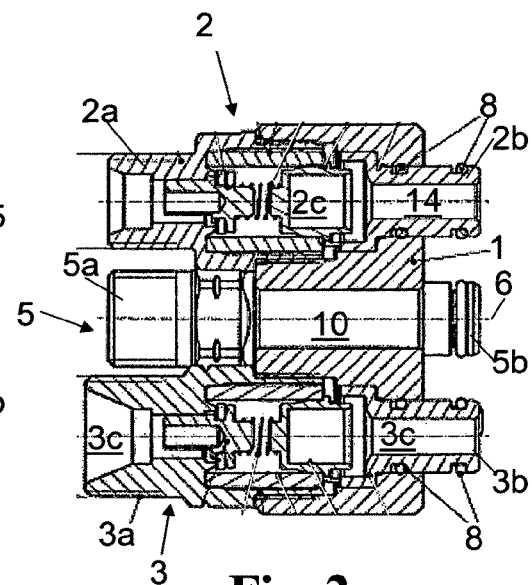
Figure 3:
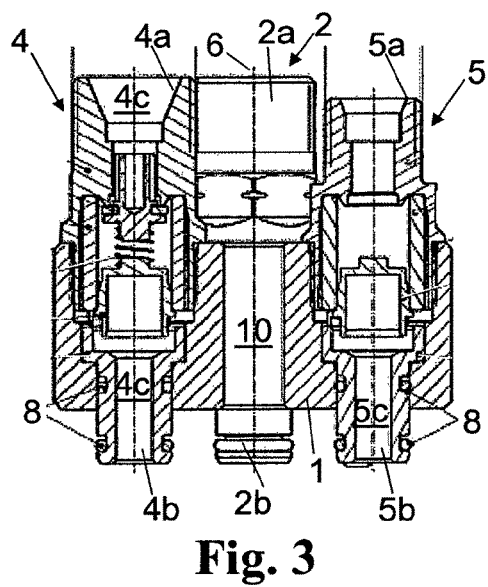
Figure 4:
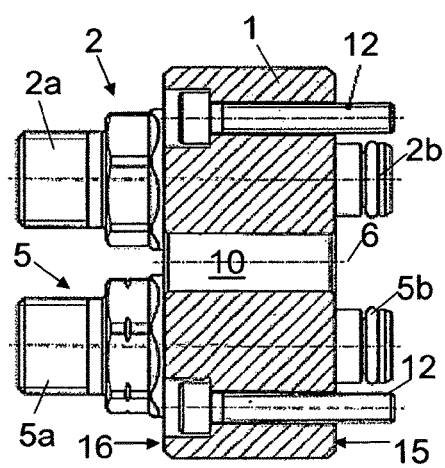

The invention will now be explained in more detail with reference to an embodiment and a drawing, in which:

FIG. 1 shows an embodiment of the safety module according to the invention in a top view on the gas outlet side, FIG. 2 shows the safety module of FIG. 1 in a longitudinal section through a first central cutting plane, FIG. 3 shows the safety module of FIG. 1 in a longitudinal section through a second central cutting plane, perpendicular to the first cutting plane, and FIG. 4 shows the safety module of FIG. 1 in a section along line A-A.

The embodiment of the safety module as shown in FIG. 1 is designed for installation into the cutting torch of a flame-cutting machine. It consists of a cylindrical monolithic base body 1 of brass which is circular in the illustrated top view and has a height of about 50 mm and a diameter of 90 mm. It serves to receive a total of four safety elements.

All safety elements are designed as gas flashback arresters 2, 3, 4, 5 for process gases of the flame cutting process. In detail, there is a gas flashback arrester 2 for an ignition gas, a gas flashback arrester 3 for cutting oxygen, a gas flashback arrester 4 for fuel gas, and a gas flashback arrester 5 for heating oxygen.

The gas flashback arresters 2, 3, 4, 5 are designed in the standard way as closing valves with a piston which is lifted by the pressure of the process gas flowing therethrough from the sealing set against the force of a spring. They reliably prevent a gradual and abrupt reverse flow of gas.

The gas flashback arresters 2, 3, 4, 5 are received in bores of the base body 1 and are evenly distributed around the central axis 6. In the case of the gas flashback arrester for fuel gas (4) a dirt filter is additionally inserted into the gas channel 4c.

The gas flashback arresters 2, 3, 4, 5 have each gas channels 2c 3c, 4c, 5c which terminate in gas outlet nozzles 2b, 3b, 4b, 5b, each projecting from the outlet side 15 of the base body 1, as can be seen in FIGS. 2 to 4. Two sealing rings 8 are arranged spaced apart on the outer surface of the gas outlet nozzles 2b, 3b, 4b, 5b.

The bores of the gas outlet nozzles 2b, 3b, 4b, 5b have inserted therein gas passage baffles (not shown in the figures), by means of which the maximum flow rate and the exit speed of the respective process gas is predetermined. The fine adjustment of these parameters takes place via pressure control. A pressure display and a separate adjustment of the respective gas amount on the respective safety element are omitted in favor of a simple and compact design.

Furthermore, each gas flashback arrester 2, 3, 4, 5 has a gas inlet nozzle 2a, 3a, 4a, 5a, which respectively projects from the inlet side 16 of the base body 1, as is also shown in FIGS. 3 to 5. The gas inlet nozzles 2a, 3a, 4a, 5a are each provided with an external thread.

The gas channel 2c, 3c, 4c, 5c for the respective process gas extends between the respective gas inlet nozzles and gas outlet nozzles.

The base body 1 further comprises a central through bore 10 which in the illustrated embodiment of the safety module serves to pass electrical lines from and to the cutting torch therethrough.

Apart from the gas outlet nozzles 2b, 3b, 4b, 5b, the base body 1 of the safety module has a planar bottom side. It is mounted on a top side of the valve body of a cutting torch, which top side is also planar, (not shown in the figures), wherein the corresponding gas channels for heating oxygen, fuel gas, cutting oxygen and ignition gas are formed within the valve body. The gas outlet nozzles 2b, 3b, 4b, 5b are designed such that they correspond to the gas line inlets at the torch side. The sealing rings 8 ensure a gastight connection. An additional fixation of the safety module on the torch takes place via Allen screws 12, which are embedded in through bores 13 of the base body 1 and which engage into corresponding threaded bores at the torch side. To ensure a correct assignment of the safety elements (2, 3, 4, 5) to the respective gas channel at the torch side when the safety module is placed on the valve body, the base body 1 is provided with a lateral recess 1 which locks into the encoding pin (not shown), which is embedded on the top side of the torch valve body.

The supply lines for heating oxygen, fuel gas, cutting oxygen and ignition gas are screwed onto the gas inlet nozzles 2a, 3a, 4a, 5a. In an alternative embodiment (not shown), the gas inlet nozzles are provided with two spaced-apart sealing rings instead of the external thread, and they are configured, just like the gas outlet nozzles, for a quick connection by plugging-on the process-gas supply lines.

Example 1

In a flame-cutting machine, as is for instance known from DE 103 32 422 A, lines are provided for the supply of fuel gas and cutting oxygen.

The flame-cutting machine comprises a cutting torch, a flame-cutting machine control, and a gas distribution system.

The cutting torch is movable by means of a torch carriage in transverse direction and by means of the longitudinal carriage along the workpiece. Fuel gas and cutting oxygen are separately supplied via gas supply lines by the gas distribution system.

Each of the gas supply lines terminates in a safety module according to FIG. 1, which safety module is provided upstream of the cutting torch and which is connected to the cutting torch shaft.

In this case the safety elements for heating torch and ignition gas are not occupied. In an alternative embodiment, the cutting torch also comprises lines for ignition gas and heating oxygen, wherein all of the four safety elements of the safety module according to FIG. 1 are connected and used accordingly.

Example 2

The safety device is suited for mounting in the gas supply installation of a torch for thermal material processing and comprises (a) a multifunctional safety module which is to be connected to the cutting torch and which has a module body (1), the module body (1) having integrated therein a gas inlet side (16) and a gas outlet side (15) facing the torch, wherein the module body (1) has integrated therein:
a first safety element (4) which between a fuel gas inlet (4a) and a fuel gas outlet (4b) comprises a gas channel (4c) for fuel gas which terminates in a fuel gas line of the torch, and
a second safety element (3) which between a cutting oxygen inlet (3a) and a cutting oxygen outlet (3b) comprises a gas channel (3c) for cutting oxygen which terminates in a cutting oxygen line of the torch,
(b) and a connection system to establish a mechanical plug-type connection between fuel gas outlet (4b) and fuel gas line and between cutting oxygen outlet (3b) and cutting oxygen line.

Preferably, the module body (1) has further integrated therein a third safety element (5), which between a heating oxygen inlet (5a) and a heating oxygen outlet (5b) comprises a gas channel (5c) for heating oxygen which terminates in a heating oxygen line of the torch, wherein the mechanical plug-type connection simultaneously serves to connect heating oxygen outlet (5b) and heating oxygen line.

Preferably, the module body (1) has further integrated therein a fourth safety element (2) which between an ignition gas inlet (2a) and an ignition gas outlet (2b) comprises a gas channel (2c) which terminates in an ignition gas line of the torch, wherein the mechanical plug-type connection simultaneously serves to connect ignition gas outlet (2b) and ignition gas line.

Preferably, the module body (1) is cylinder-shaped and has a central axis (5) around which the first (4), second (3), third (5) and fourth (2) safety elements are evenly distributed.

Preferably, the module body (1) has a through bore (10) which extends between inlet side (16) and outlet side (15) and which particularly preferably extends coaxial to the central axis (6).

Preferably, the module body is cylinder-shaped and has a central axis, wherein one of the safety elements extends coaxial to the central axis.

Preferably, the connection system comprises a threaded connection with at least two screws (12) that extend starting from the module-body inlet side in threaded bores of the torch.

Preferably, the first safety element (4) and the second safety element (3) are configured as gas flashback arresters.

Preferably, the fuel gas outlet (4b) and the cutting oxygen outlet (3b) are respectively configured as an outlet nozzle having an inner bore, wherein a gas flow baffle is respectively insertable into the inner bore.

Preferably, the connection system comprises a plug-type connection between a fuel gas inlet (4a) and a fuel-gas supply line and a plug-type connection between the cutting oxygen inlet (3a) and a cutting-oxygen supply line.

The invention claimed is:

1. A safety device adapted to be mounted in a gas supply installation of a cutting torch of a flame-cutting machine, said safety device comprising:
a multifunctional safety module configured to be connected to the cutting torch and which has a module body, the module body having therein:
a first safety element that prevents flame- or gas-blowout and that comprises a first gas channel carrying fuel gas between a fuel gas inlet and a fuel gas outlet, said first gas channel being configured to be connected to a fuel gas line of the cutting torch, and
a second safety element that prevents a flame- or gas-blowout, and that comprises a second gas channel carrying cutting oxygen between a cutting oxygen inlet and a cutting oxygen outlet, said second gas channel being configured to be connected to a cutting oxygen line of the cutting torch, and a connection system creating a mechanical plug connection between the fuel gas outlet and the fuel gas line and between the cutting oxygen outlet and the cutting oxygen line wherein the module body has further integrated therein a third safety element that prevents a flame- or gas-blowout, which comprises a third gas channel carrying heating oxygen between a heating oxygen inlet and a heating oxygen outlet, said third gas channel being configured to be connected to a heating oxygen line of the cutting torch, wherein the mechanical plug plug connection simultaneously serves to connect the heating oxygen outlet and the heating oxygen line;

wherein the module body has further integrated therein a fourth safety element that comprises a fourth gas channel between an ignition gas inlet and an ignition gas outlet said third gas channel being configured to be connected to an ignition gas line of the cutting torch, wherein the mechanical plug connection simultaneously serves to connect said ignition gas outlet and said ignition gas line.

2. A safety device according to claim 1, wherein the module body is cylinder-shaped and has a central axis around which the first, second, third and fourth safety elements are evenly distributed.

3. A safety device according to claim 2, wherein the module body has a gas inlet side and a gas outlet side facing the cutting torch, and the module body has a through bore therein that extends between inlet side and outlet side.

4. A safety device according to claim 1, wherein the module body is cylinder-shaped and has a central axis, wherein one of the safety elements extends in a direction coaxial to the central axis.

5. A safety device according to claim 3, wherein the cutting torch has threaded bores therein, and the connection system comprises a threaded connection with at least two screws that extend starting from the module body inlet side in the threaded bores of the cutting torch.

6. A safety device according to claim 1, wherein the fuel gas outlet and the cutting oxygen outlet are each configured as a respective outlet nozzle having an inner bore.

7. A safety device according to claim 1, wherein the connection system comprises a plug connection between the fuel gas inlet and a fuel-gas supply line and a plug connection between the cutting oxygen inlet and a cutting-oxygen supply line.

8. A safety device according to claim 1, wherein the first safety element is a gas flashback arrester or a flame arrester.

9. A safety device according to claim 1, wherein the second safety element is a gas flashback arrester or a flame arrester.

10. A flame-cutting machine comprising:
a cutting torch,
a gas supply installation for the cutting torch; and
a safety device according to claim 1 mounted in the gas supply installation, wherein the safety module is connected to the cutting torch, and the first safety element is connected to a fuel gas line of the cutting torch, and the second safety element is connected to a cutting oxygen line of the cutting torch.

11. A safety device according to claim 3, wherein through bore extends in a direction coaxial to the central axis.

* * * * *